(12) United States Patent
Leimer

(10) Patent No.: US 8,246,006 B2
(45) Date of Patent: Aug. 21, 2012

(54) ARTICULATING GUIDE SEAL

(75) Inventor: Mark A. Leimer, Fort Wayne, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 1308 days.

(21) Appl. No.: 11/421,646

(22) Filed: Jun. 1, 2006

(65) Prior Publication Data

US 2007/0278441 A1    Dec. 6, 2007

(51) Int. Cl.
    *F16K 31/44* (2006.01)
(52) U.S. Cl. ............ 251/214; 251/335.3; 277/353; 277/502; 277/600
(58) Field of Classification Search .......... 251/214, 251/335.3; 277/353, 502, 600; 123/188.6, 123/188.9
    See application file for complete search history.

(56) References Cited

U.S. PATENT DOCUMENTS

| | | | |
|---|---|---|---|
| 3,372,941 A | 1/1965 | Liebig | |
| 3,427,034 A * | 2/1969 | Lowe | 277/566 |
| 4,317,436 A * | 3/1982 | Barnhart et al. | 123/188.6 |
| 4,588,195 A * | 5/1986 | Antonini et al. | 277/553 |
| 4,695,061 A | 9/1987 | Meisner et al. | |
| 4,773,363 A | 9/1988 | Stritzke | |
| 4,822,061 A | 4/1989 | Kammeraad | |
| 4,909,202 A | 3/1990 | Binford et al. | |
| 4,947,811 A | 8/1990 | Binford | |
| 4,993,379 A | 2/1991 | Viazzi | |
| 5,174,256 A | 12/1992 | Binford | |
| 5,237,971 A | 8/1993 | Worsley | |
| 5,476,271 A * | 12/1995 | Hatting et al. | 277/529 |
| 6,209,504 B1 | 4/2001 | Hegemier et al. | |
| 6,244,235 B1 | 6/2001 | Hegemier et al. | |
| 6,394,463 B1 | 5/2002 | Otani | |
| 6,609,700 B2 * | 8/2003 | Leimer | 251/214 |
| 6,761,141 B2 * | 7/2004 | Leimer | 123/188.6 |

* cited by examiner

*Primary Examiner* — John Bastianelli
(74) *Attorney, Agent, or Firm* — Marshall & Melhorn LLC

(57) ABSTRACT

A valve seal has a sealing lip and a compressible portion. The valve seal is utilized to seal a valve guide and a stem. The valve guide has a height within a predetermined range of heights and the sealing lip sealingly engages the stem. The compressible portion has at least two articulating portions with a hinge portion between the two articulating portions. The compressible portion sealingly engages the valve guide and articulates to accept the valve guide without substantially deforming the lip or interfering with the stem.

13 Claims, 4 Drawing Sheets

ARTICULATING GUIDE SEAL

TECHNICAL FIELD

The embodiments described herein are generally directed to valve stem seals, and more particularly to a valve guide seal.

BACKGROUND

In conventional overhead-valve internal combustion engines, at least two valves reciprocate to provide intermittent communication between intake and exhaust manifolds and a combustion chamber. The valves include valve stems commonly disposed in valve stem guides supporting axial motion of the valves in an engine component such as an engine head. Lubrication is provided to upper portions of the valve stems by a spray of lubricating oil within a valve cover disposed over the engine head or by gravity flow from an associated rocker arm. Oil flows by the force of gravity and may be encouraged by a pressure differential between the manifold and crankcase along a free upper end of the valve stem toward the manifolds and valve heads.

Valve guide seals located between the valve stem and the valve guide serve various purposes. First, they minimize engine oil consumption by restricting oil entry into the manifold and the combustion chamber. Second, they help to minimize exhaust particulates that contribute to pollution. Third, they are helpful in minimizing guide wear, which is of particular importance with diesel engines due to the nature of their operation.

However, current valve seals do not account for valve guide height tolerances. If a valve guide height exceeds the specified tolerance for the associated valve seal, the seal may be deformed. Thus, the sealing of the valve stem and valve guide is compromised. Deformation of the valve seal typically occurs when the height of the valve guide is out of tolerance. Due to the increased height, the valve guide seal is compressed between a retainer and the valve guide.

Therefore, it is desirable to provide a valve seal that allows for various tolerance valve guides. Further, it is desirable that the valve seal not interfere with the action of the valve stem. It is further desirable that a single valve stem seal may be used for a variety of valve guides having multiple heights, thus allowing for the use of the same valve seal in multiple components.

SUMMARY

Provided is a valve seal for sealing a valve guide and a stem. The valve guide has a height within a predetermined range and the valve seal comprises a sealing lip for sealingly engaging the stem, a compressible portion sealingly engaging the valve guide and articulating to accept the valve guide without substantially deforming the lip or interfering with the stem.

Further, a valve seal is provided for sealing a stem and a valve guide comprising a body of resilient material, a sealing lip on an inner portion of the body for sealing the stem, and a collapsible portion engaging the valve guide and adjusting in height to the valve guide.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
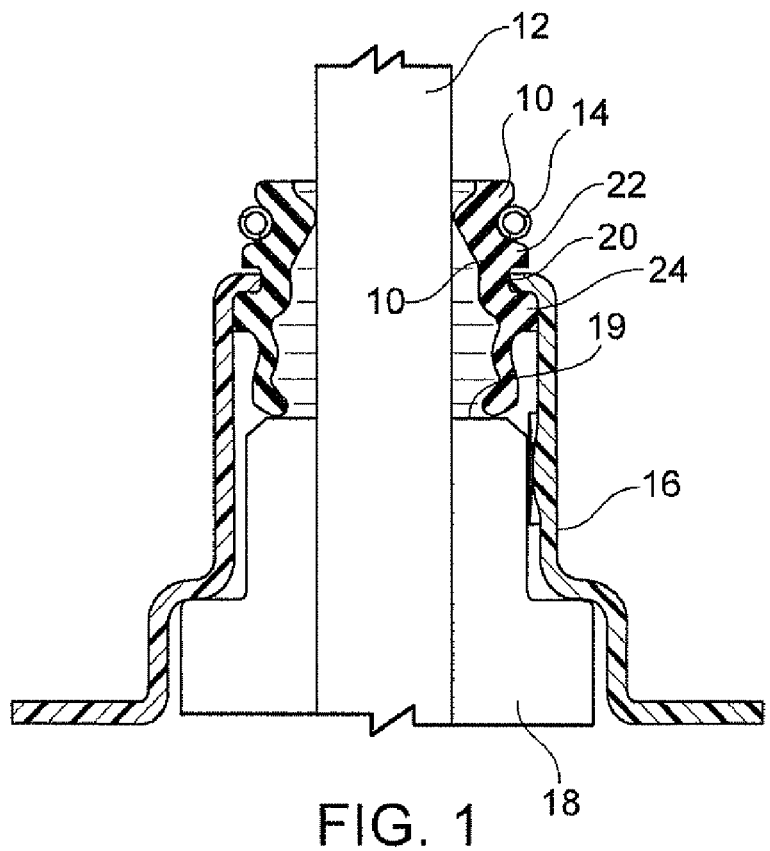
FIG. 1 is a partial cross-sectional view of a sealing system having an articulating valve guide seal for a valve stem and valve guide.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

FIG. 1 illustrates an embodiment of a valve seal 10. When installed, valve seal 10 surrounds a stem 12 and provides a sealing action. A spring 14 surrounds valve seal 10 and provides a sealing compression force. Valve seal 10 is held in place by a retainer 16 attached to a non-moving component (not shown). A valve guide 18 surrounds stem 12 and includes an upper sealing surface 19.

Retainer 16 is configured as a clip to hold valve seal 10 in place. Retainer 16 interfaces with valve seal 10 at a retainer seat 20 (also see FIG. 4) that circumferentially surrounds valve seal 10. Valve seal 10 is held in place by upper retainer portion 22 and a lower retainer portion 24. Because valve seal 10 is made of resilient material and is deformable, it is installed within retainer 16 by deforming it until retainer 16 is seated around retainer seat 20.

Figure 2:
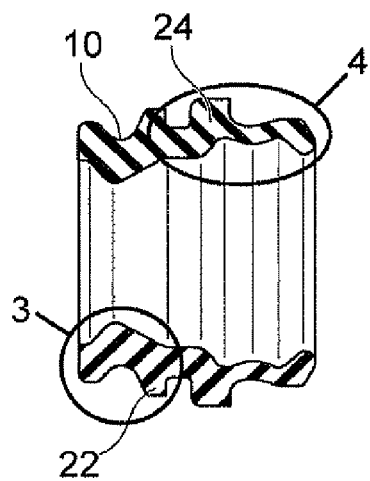
FIG. 2 is a partial cross-sectional view of a sealing grommet for the sealing system of FIG. 1, according to an illustrative embodiment.

FIG. 2 illustrates in detail valve seal 10. Valve seal 10 includes a stem sealing portion 3 (illustrated in enlarged detail in FIG. 3) and a guide sealing portion 4 (illustrated in enlarged detail in FIG. 4). Stem sealing portion 3 functions, among other things, to seal around the outer circumference of stem 12. Guide sealing portion 4 functions to seal around the top of valve guide 18.

Figure 3:
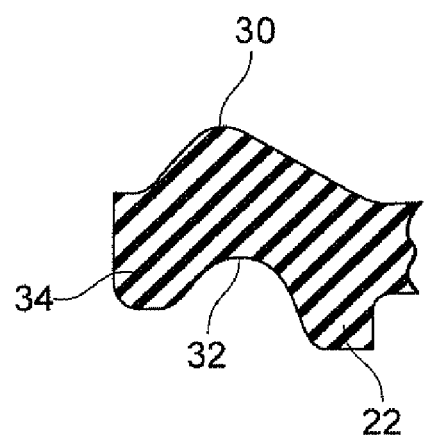
FIG. 3 is an enlarged, fragmentary cross-sectional view of an illustrative embodiment of a sealing portion of the sealing grommet taken from area 3 in FIG. 2.

FIG. 3 is an enlarged, fragmentary cross-sectional view of a first illustrative embodiment of sealing portion 3. Sealing portion 3 is configured with a sealing lip 30 to seal stem 12 when in motion. Further provided is a spring seat 32 that circumferentially surrounds sealing lip 30 and provides a mounting groove in which to locate spring 14. Spring seat 32 is positioned between a top 34 of valve seal 10 and upper retainer portion 22. Spring 14 provides a compressive force substantially around sealing lip 30 and forces sealing lip 30 against stem 12

Figure 4:
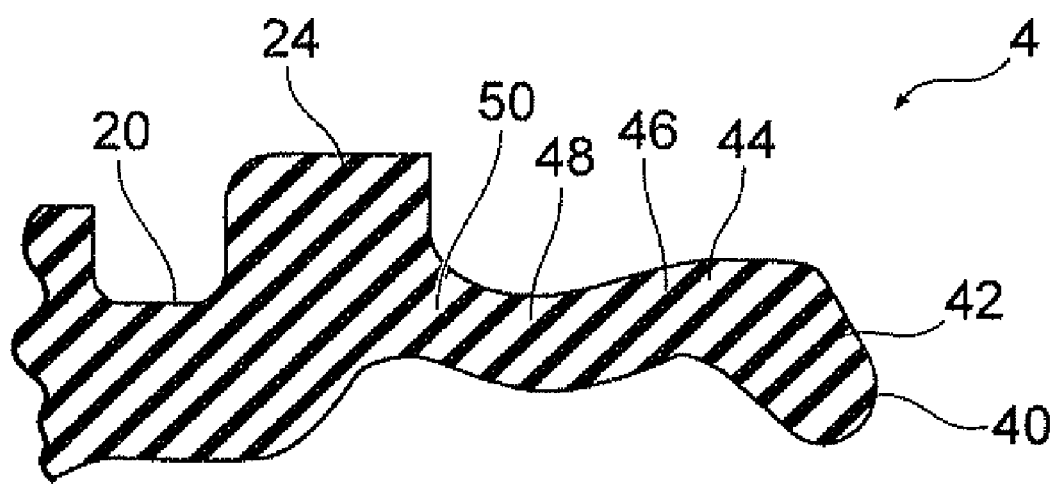
FIG. 4 is an enlarged, fragmentary cross-sectional view of an articulating portion of the sealing grommet taken from area 4 in FIG. 2.

Referring now to FIGS. 2 and 4, an illustrative embodiment of guide sealing portion 4 of valve seal 10 is shown. Guide sealing portion 4 includes a first articulating portion 40, a foot portion 42, a first hinge 44, a second articulating portion 46, a second hinge 48, and a third articulating portion 50. First articulating portion 40 (also known as the "guide lip" of valve seal 10) is configured to have an offset biased toward the inside of valve seal 10 (i.e., toward stem 12 when installed). Foot portion 42 is a generally planar portion extending from first articulating portion 40 to first hinge 44. First hinge 44 is located between first articulating portion 40 and second articulating portion 46 and is configured to allow for first articulating portion 40 to fold when compressed. Thus, first hinge 44 allows first articulating portion 40 to swing towards second articulating portion 46. In this embodiment, first hinge 44 has its hinging side oriented towards the outside of valve seal 10.

Similarly, second hinge 48 is disposed between second articulating portion 46 and third articulating portion 50. When compressed, second hinge 48 allows second articulating portion 46 to fold over towards third articulating portion 50. In this embodiment, second hinge 48 has its hinging side oriented towards the inside of valve seal 10. Because first hinge 44 and second hinge 48 having hinging sides opposite each other, they are configured for accordion-like collapsing when compressed.

Third articulating portion 50 connects guide sealing portion 4 with lower retainer portion 24 (which is non-moving). Thus, when valve guide 18 is installed, it will press upwardly upon guide sealing portion 4 and compress it between valve guide 18 and lower retainer portion 24. Further, foot portion 42 of guide sealing portion 4 is configured to seal against valve guide 18 when installed (as explained in detail below with respect to FIGS. 5A-5E).

Figure 5A:
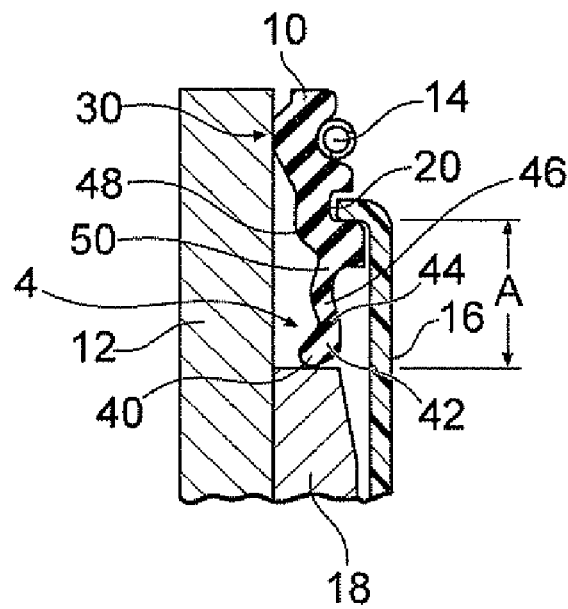
FIG. 5A is a partial cross-sectional view of the articulating portion of FIG. 4 when used with a guide of a first height.

FIGS. 5A-5H illustrate valve seal 10 in use with valve guides 18 having various heights. More specifically, distances A, B, C, D, E, F, G, and H shown in FIGS. 5A-5H, respectively illustrate decreasing distances between valve guide 18 and retainer seat 20 (i.e. the distances are A>B>C>D>E>F>G>H). These decreasing distances correspond to increasing heights for valve guide 18 (i.e., FIG. 5A illustrates a shorter valve guide 18 than FIG. 5H). Thus, by way of example, the function of guide sealing portion 4 is shown.

FIG. 5A shows valve seal 10 in a first installed position where sealing lip 30 seals valve seal 10 to stem 12 and where first articulating portion 40 seals valve seal 10 to valve guide 18. Valve guide 18 is installed from below and engages guide sealing portion 4 at first articulating portion 40. Valve guide 18 is of a predetermined height and allows for the slight compression of lower guide sealing portion 4. Here, valve guide 18 is of a height that compresses guide sealing portion 4 to a distance A between valve guide 18 and retainer seat 20. Further, the compression seals valve guide 18 against first articulating portion 40.

At compression distance A, first hinge 44 provides for only minor folding of first articulating portion 40 and second articulating portion 46. Similarly, only minor folding of second articulating portion 46 and third articulating portion 50 is provided by second hinge 48. Indeed, at the maximum compression distance A, valve guide 18 is only minimally compressed beyond the uninstalled configuration so that the predetermined sealing force of first articulating portion 40 against valve guide 18 is maintained.

Figure 5B:
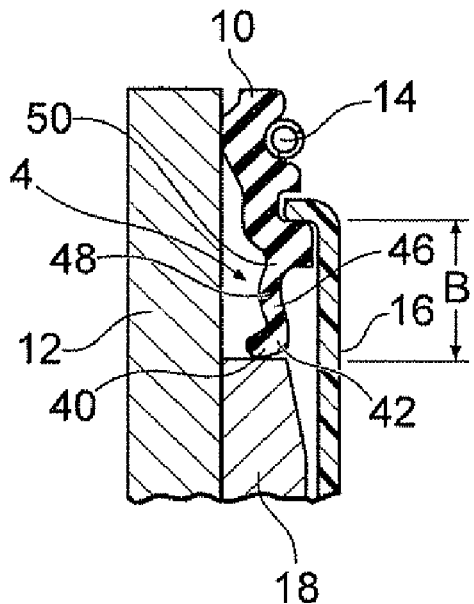
FIG. 5B is a partial cross-sectional view of the articulating portion of FIG. 4 when used with a guide of a second height.

FIG. 5B shows valve seal 10 where valve guide 18 is installed to provide guide sealing portion 4 with a height B. At compression distance B, a more pronounced folding of first articulating portion 40 toward second articulating portion 46 is shown. Further, only slight folding of second articulating portion 46 (near second hinge 48) towards third articulating portion 50 is shown. The seal between guide sealing portion 4 and valve guide 18 is now transitioning from first articulating portion 40 to foot portion 42.

Figure 5C:
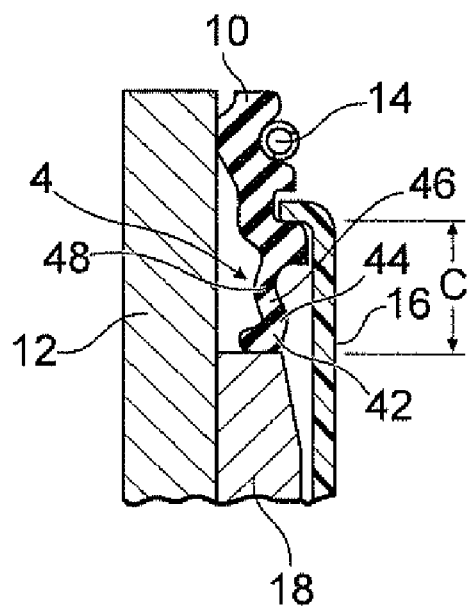
FIG. 5C is a partial cross-sectional view of the articulating portion of FIG. 4 when used with a guide of a third height.

FIG. 5C shows valve seal 10 where valve guide 18 is installed to provide guide sealing portion 4 with a height C. At compression distance C, a more pronounced folding of first articulating portion 40 towards second articulating portion 46 is noticeable. Further, the seal between guide sealing portion 4 and valve guide 18 is now transitioned to the outer surface of foot portion 42.

Figure 5D:
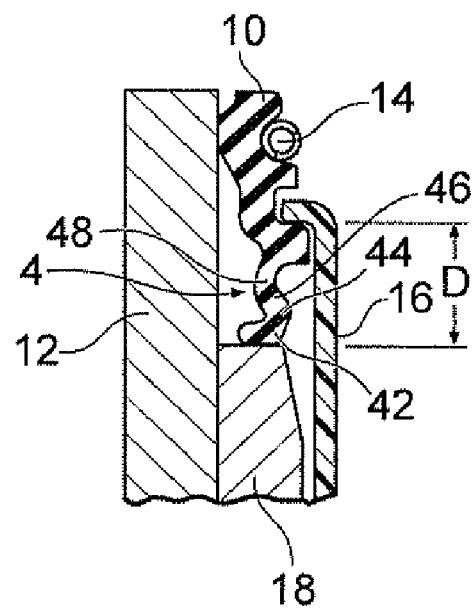
FIG. 5D is a partial cross-sectional view of the articulating portion of FIG. 4 when used with a guide of a fourth height.

FIG. 5D shows valve seal 10 where valve guide 18 is installed to provide guide sealing portion 4 with a height D. At compression distance D, sealing function remains between foot portion 42 and valve guide 18. However, first articulating portion 40 is folded toward second articulating portion 46 more so than in FIG. 5D.

Figure 5E:
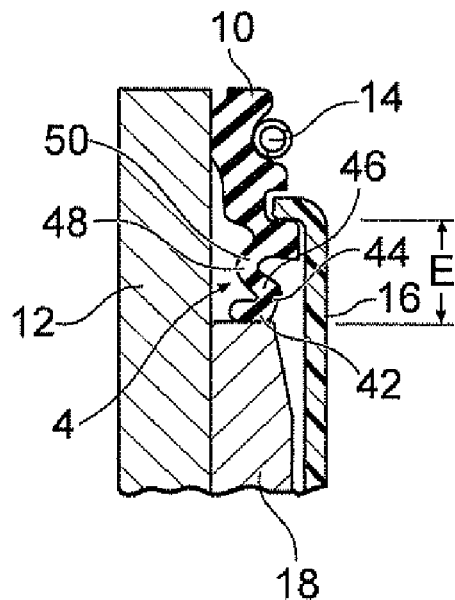
FIG. 5E is a partial cross-sectional view of the articulating portion of FIG. 4 when used with a guide of a fifth height.

FIG. 5E shows valve seal 10 where valve guide 18 is installed to provide guide sealing portion 4 with a height E. At compression distance E, first hinge 44 and second hinge 48 are continuing to close.

Figure 5F:
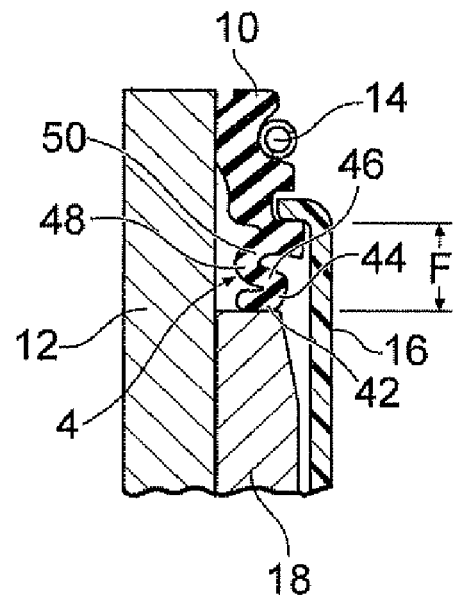
FIG. 5F is a partial cross-sectional view of the articulating portion of FIG. 4 when used with a guide of a sixth height.

FIG. 5F shows valve seal 10 where valve guide 18 is installed to provide guide sealing portion 4 with a height F. At compression distance F, first articulating portion 40 is nearly touching second articulating portion 46. First hinge 44 is thus nearly fully closed. Second hinge 48 is substantially closed.

Figure 5G:
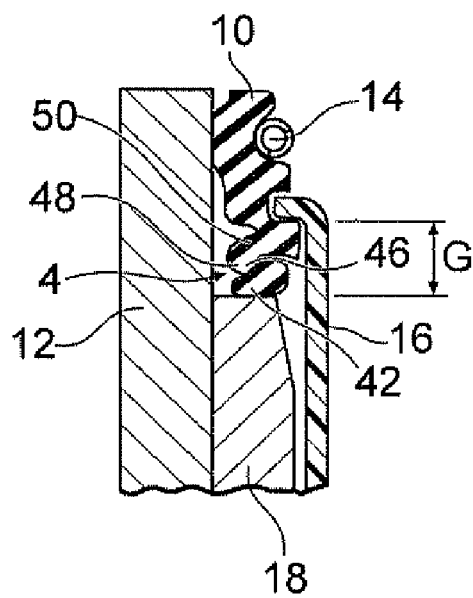
FIG. 5G is a partial cross-sectional view of the articulating portion of FIG. 4 when used with a guide of a seventh height.

FIG. 5G shows valve seal 10 where valve guide 18 is installed to provide guide sealing portion 4 with a height G. At compression distance G, first articulating portion 40 is compressed against second articulating portion 46 and first hinge 44 is completely closed. Second hinge 48 is nearly completely closed and third articulating portion 50 is nearly touching second articulating portion 46. Notably, the sealing of guide sealing portion 4 and valve guide 18 remains at foot portion 42.

Figure 5H:
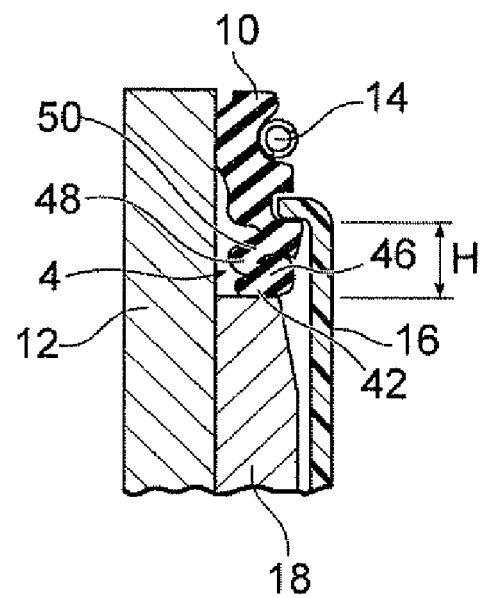
FIG. 5H is a partial cross-sectional view of the articulating portion of FIG. 4 when used with a guide of an eighth height.

FIG. 5H shows valve seal 10 where valve guide 18 is installed to provide guide sealing portion 4 with a height H. At compression distance H, guide sealing portion 4 is at the maximum allowable height for valve guide 18. Guide sealing portion 4 is fully articulated in an accordion-like manner where first articulating portion 40 is folded against second articulating portion 46 that is in turn folded against third articulating portion 50. Thus, valve guide 18 should not be installed where a distance less than H is provided guide sealing portion 4. If this occurs, the seal between foot portion 42 and valve guide 18 may be lost. Additionally, due to the force of valve guide 18 against guide sealing portion 4, retainer 16 may become pulled from retainer seat 20. Therefore, valve seal 10 may no longer be functional.

Referring to FIGS. 5A-5H, the accordion-like folding action of guide sealing portion 4 is illustrated through a maximum distance A to a minimum distance H. Valve guide 18 may be installed wherein the tolerances for height are significantly greater than standard guide seals would allow. Because valve seal 10 has the above-described articulating features, a valve guide of variable height may be used without degradation of performance. Further, because multiple heights are allowable, the same valve seal 10 may be used for multiple parts and programs.

Additionally, the folding action of guide sealing portion 4 allows for the variability in valve guide 18 height without interfering with retainer 16, valve guide 18, or stem 12. As illustrated in FIGS. 5A-5H, the full range of accordion-like compression is allowed without contact with retainer 16 or stem 12. Guide sealing portion 4 folds neatly around, but not touching, stem 12. Further, guide sealing portion 4 folds neatly within retainer 16. As shown, even when guide sealing portion 4 is fully articulated, foot portion 42 provides a seal between valve seal 10 and valve guide 18.

Herein, valve seal 10 in an illustrative embodiment that includes a bellows-shaped sealing lip (illustrated in detail with respect to FIG. 4) adapted to seal the top of valve guide 18 allowing for the sealing of valve guide 18, subject to a high guide height tolerance. The embodiment is capable of absorbing a relatively high guide height tolerance by folding in accordion-like fashion around the valve stem, thereby maintaining a sealing function against the valve guide.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A valve seal for sealing a valve guide and a stem, the valve guide having a height within a predetermined range of heights thereof, the valve seal comprising:
    a sealing lip for sealingly engaging the stem; and
    a compressible portion comprising at least two articulating portions and a hinge portion therebetween, a first of the at least two articulating portions having a bias toward the stem when installed, each of the at least two articulating portions bending at the hinge thereby folding opposite one another in an accordion-like fashion when compressed by the valve guide, sealingly engaging the valve guide and configured to articulate to accept the valve guide without substantially deforming said lip or interfering with said stem.

2. The valve seal of claim 1, wherein said compressible portion is foldable under said sealing lip when compressed by the valve guide.

3. The valve seal of claim 2, wherein said compressible portion is foldable towards the stem.

4. The valve seal of claim 1, further comprising a spring seat substantially surrounding said sealing lip.

5. The valve seal of claim 1, further comprising a retainer seat, said retainer seat being configured for engaging a retainer clip and holding said sealing lip in a fixed position relative to said retainer clip.

6. The valve seal of claim 1, wherein said compressible portion further comprises a third articulating portion and another hinge portion disposed between said second articulating portion and said third articulating portion, such that when the valve guide is installed, said first articulating portion is foldable under said second articulating portion and said second articulating portion is foldable under said third articulating portion.

7. A valve seal for sealing a stem and a valve guide comprising:
    a body of resilient material;
    a sealing lip on an inner portion of said body for sealing the stem; and
    a collapsible portion comprising at least two articulating portions and a hinge portion therebetween, a first of said at least two articulating portions having a bias toward said stem when installed, each of said at least two articulating portions bending at said hinge thereby folding opposite one another in an accordion-like fashion, and said collapsible portion sealably engaging the valve guide and adjusting in height to the valve guide without substantially deforming said lip or interfering with said stem.

8. The valve seal of claim 7, wherein said compressible portion is configured to reduce its height by folding upon itself.

9. The valve seal of claim 7, wherein said compressible portion is configured to reduce its height by folding in a bellows-like manner.

10. The valve seal of claim 7, wherein said collapsible portion further comprises a third articulating portion and another hinge portion disposed between said second articulating portion and said third articulating portion, such that when the valve guide is installed, said first articulating portion is foldable under said second articulating portion and said second articulating portion is foldable under said third articulating portion.

11. The valve seal of claim 7, further comprising a retainer engagement portion circumferentially surrounding said body, and wherein said collapsible portion is compressible against said retainer engagement portion when the valve guide is installed.

12. A valve seal for sealing a stem and a valve guide, the valve guide having a height from a lower surface to an upper surface, the valve seal comprising:
    a body of resilient material having an uncompressed length and a compressed length;
    a sealing lip on an inner portion of said body for sealing the stem;
    a spring for forcing said sealing lip against the stem; and
    an adjustable height portion comprising at least two articulating portions and a hinge portion therebetween, a first of the at least two articulating portions having a bias toward the stem when installed, each of said at least two articulating portions bending at said hinge thereby folding opposite one another in an accordion-like fashion, and said adjustable height portion sealingly engaging the upper surface of the valve guide and configured to articulate to accept the valve guide without substantially deforming said lip or interfering with said stem, whereby said adjustable height portion compresses when the valve guide is installed.

13. The valve seal of claim 12, wherein said adjustable height portion is configured to reduce its height by folding upon itself.

* * * * *